United States Patent [19]

Rood

[11] 4,346,849
[45] Aug. 31, 1982

[54] AIRLESS SPRAY NOZZLE AND METHOD OF MAKING IT

[75] Inventor: Alvin A. Rood, Oberlin, Ohio

[73] Assignee: Nordson Corporation, Amherst, Ohio

[21] Appl. No.: 706,361

[22] Filed: Jul. 19, 1976

[51] Int. Cl.³ .............................................. B05B 1/00
[52] U.S. Cl. .................................... 239/597; 239/601; 29/157 C
[58] Field of Search .............. 29/157 C; 239/597, 599, 239/601

[56] References Cited

U.S. PATENT DOCUMENTS

| 2,522,928 | 9/1950 | Carroll | 239/597 X |
| 2,621,078 | 12/1952 | Wahlin | 239/597 |
| 2,774,631 | 12/1956 | Wahlin | 29/157 C X |
| 3,181,798 | 5/1965 | Wahlin | 239/601 |
| 3,196,527 | 7/1965 | Bete | 29/157 C |
| 3,647,147 | 3/1972 | Cook | 239/599 |
| 3,697,313 | 10/1972 | Stumphauzer | 239/601 X |
| 3,754,710 | 8/1973 | Chimura | 239/597 |

Primary Examiner—Richard A. Schacher
Attorney, Agent, or Firm—Thomas J. Rossa; John P. Donohue, Jr.; Stephen T. Belsheim

[57] ABSTRACT

An airless spray coating nozzle is made by cutting interpenetrating grooves into opposite sides of a nozzle tip blank. The groove on the pressurized or entrance side of the tip has a bottom portion which is wedge-shaped in cross section. The groove on the unpressurized or exit side of the tip has a bottom portion which is trapezoidal in cross section. Both grooves are cut into the nozzle tip with a grinding wheel after the tip has been hardened.

42 Claims, 12 Drawing Figures

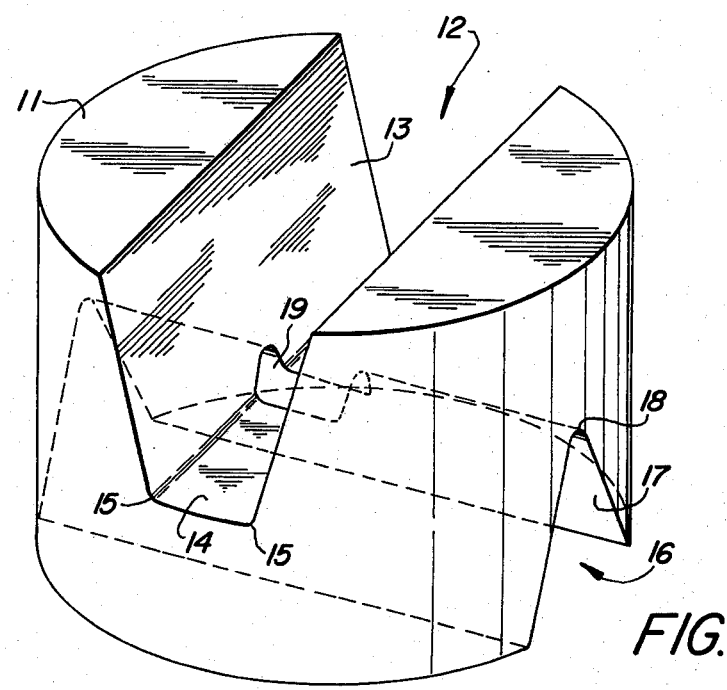
FIG. 1
FIG. 2
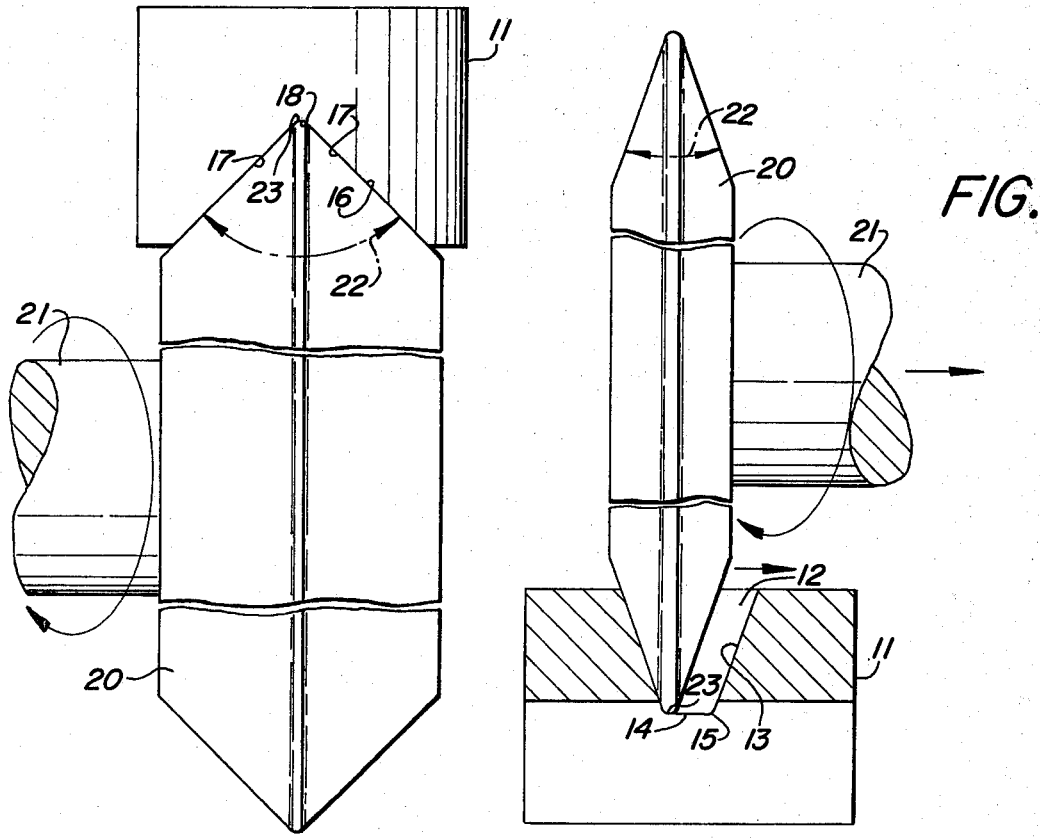
FIG. 3

AIRLESS SPRAY NOZZLE AND METHOD OF MAKING IT

BACKGROUND OF THE INVENTION

1. Field of the Invention

This invention relates generally to airless spray nozzles, and more particularly relates to airless spray nozzles used in the coating industry.

2. Description of the Prior Art

Spray nozzles are used to break up a liquid into a large number of small droplets. This process is called atomization. The atomization of liquids is used for varied purposes such as applying insecticides to plants, spraying water, and applying coating material to a substrate. Upon discharge from the atomizing nozzle, the fluid breaks up into droplets and forms a spray pattern or a cloud of droplets. In the spray coating industry, a common pattern is in the shape of a flat fan. The flat fan may have paint droplets concentrated heavily in the middle with a diminishing amount of paint droplets in the fan as the edges of the fan are approached; or, paint droplets may be heavily concentrated at one side with a diminishing amount as the other side of the fan is approached.

Nozzles to produce flat fan patterns generally take one of two forms: either air or airless. Air atomizing nozzles issue a stream of fluid which is broken up by jets of air directed at the fluid issuing from the nozzle. Airless spray nozzles effect the breakup of the fluid by causing the fluid to be ejected in a thin film or sheet. Forces acting on this sheet of fluid cause it to break up into small droplets. The physical mechanisms causing the sheet to break up into droplets is well known in the art and will not be discussed in detail here.

Many different approaches have been taken to construct airless spray nozzles. Invariably, the airless spray nozzle tips comprised a blank or member from which the tip would be made in which an opening or orifice had been formed. The orifice was generally formed by the interpenetration of two recesses; one recess from either side of the tip. The shape of the recesses have been many and varied. The most widely used airless spray nozzle tips today utilize a domed shape recess on the pressurized side of the tip with an interpenetrating recess from the other side of the tip.

It is desirable to make the nozzle tip out of a very hard material such as ceramic or sintered tungsten carbide. The hard material decreases the rate at which the nozzle orifice will wear. In airless nozzle tips made from these materials, at least one of the recesses (for example, the dome) was formed in the material before final hardening.

Another approach to making a nozzle tip orifice is described in the U.S. Pat. No. 1,151,258 issued to Fischer. In this patent the nozzle tip is formed by interpenetrating cuts from either side of the tip. The cuts are made by cutting wheels which have small rotating or spinning radii and therefore produce curved bottom slots in either side of a disc-like tip member. This nozzle was used to produce a fan shaped spray pattern for an oil burner.

SUMMARY OF THE INVENTION

The requirements of an airless spraying nozzle for the spray coating industry are stringent. Paint droplets must be finely divided and must be properly distributed across the fan width. There should be no heavy deposits of paint made at the extreme portions of the fan pattern. This heaviness at the extreme portions of the fan pattern is known as "tailing".

In the manufacturing process it is desirable to be able to make nozzles consistently the same, and yet quickly and inexpensively.

I have found that if both of the interpenetrating recesses on either side of the nozzle tip are cut into a material having a macroscopic hardness of 50 or greater on a Rockwell C scale, then an improved airless spray nozzle results. There is no precise cutoff point for the hardness below which the nozzles are poor and above which the nozzles are perfect. The results continually improve as the hardness of the material increases.

Sintered tungsten carbide is substantially harder than 50 Rockwell C (85.5 to 92.8 Rockwell A). Finally sintered tungsten carbide has been found to be an excellent material.

Finally hardened ceramic or tool steel or even jewels could be used. In the case of tungsten carbide the particle size of the individual pieces of bound carbide should be small so that a smooth surface results when the material is cut. Further, if a material other than carbide is chosen the material should have a low ductility. That is, the yield point and fracture point of the material should be close to each other. As the ductility of the material decreases, so likewise does the tendency of a material to form burrs when cut.

I believe that the cutting of both recesses after final hardening results in a nozzle orifice opening in which the edges of the orifice are sharper and more regular than those of the prior art. I believe that the deficiencies of the prior art were in the fact that when one of the recesses was formed prior to final hardening of the nozzle tip, then this recess would be susceptible to some deformation during the hardening process. Any slight deformation would result in irregularities in the shape of the orifice opening and in the edge of the orifice opening. Further, the very process of forming the recess resulted in some surface roughness or graininess. This roughness again would cause irregularities in the edge of the orifice opening. Further, even in the nozzles having both recesses cut, the recesses were cut into a soft ductile material such as stainless steel, or were cut prior to final hardening. When recesses are cut into soft ductile materials such as stainless steel, the edges of the opening of the orifice are susceptible to being deformed or bent due to the ductile nature of the material and are also susceptible to having burrs form on them when cut. This again results in irregularities of the edges of the orifice opening. By the process of the present invention, irregularities in the edge arising from any cause such as irregularities in the recess, irregularities in the surface of the recess, deformations, or burrs, are reduced considerably.

I have found that a wedge-shaped groove on the pressurized (back or entrance) side of the nozzle tip interpenetrating a trapezoidal shaped groove on the opposed discharge (front or exit) side produces a nozzle orifice opening where the flow capacity of the nozzle and fan pattern produced are predictable, and where the concentration of the fluid droplets in the fan pattern are properly distributed. Further the shape of these grooves are compatible with the process of cutting the grooves after final hardening of the nozzle tip material.

The trapezoidal groove has a flat bottom being one of the bases of the trapezoid, with sides slanting away from the orifice opening, and with the larger base of the trapezoid being open. The trapezoid-shaped groove can range from its degenerate form of a wedge, to a true trapezoid having a flat base with the sides sloping away from the nozzle orifice opening.

In the simplest form of the nozzle tip, which is the most predictable, the wedge-shaped groove has a substantially straight bottom. The straight bottom of the wedge-shaped groove is parallel to the plane defined by the bottom of the trapezoidal-shaped groove; and lines defined by the intersection of the side walls of the trapezoidal groove with the bottom of the trapexoidal groove are perpendicular to the bottom of the wedge-shaped groove. A plane bisecting the angle formed by the side walls of the wedge-shaped groove is perpendicular to a plane defined by the bottom of the trapezoidal groove. In this form the spray pattern of the nozzle is a fan with droplets heavily concentrated in the center of the fan pattern and diminishing in concentration towards the ends of the fan.

It has also been found that the use of the wedge-shaped groove on one side interpenetrating a trapezoidal-shaped groove on the other side results in a nozzle where a single wedge-shaped groove can be interpenetrated by a trapezoidal groove of varying dimensions. The varying dimensions of the trapezoidal groove allows for different flow capacities and fan patterns. A single wedge-shape cut can be combined with a greater number of different interpenetrating trapezoidal cuts to produce a greater range of flow capabilities and fan patterns than have heretofore been possible with other forms of interpenetrating recess.

I have also found that if the interpenetrating cuts are the same as defined immediately above with the exception that the plane bisecting the wedge-shaped cut forms an angle of between 15° to 30° from the perpendicular with the bottom of the trapezoidal cut, then a "drum head" or "controlled pattern" type nozzle results; with all of the same benefits of the nozzle for the ordinary flat fan spray where the paint is heavily concentrated toward the middle and diminishes in concentration towards the edges of the fan pattern. In a drum-head nozzle the paint droplets are heavily concentrated to one side and then gradually diminish in concentration across the width of the fan pattern.

It is an object of this invention to provide a nozzle construction which produces flat fan sprays where the surfaces can be cut, even after final hardening of the material making up the nozzle tip.

It is another object of this invention to produce a nozzle and a method of making it where the nozzle has a reduced tendency to tail.

It is still another object of this invention to provide a spray nozzle which has improved consistency of spray pattern and atomization.

It is another object of this invention to provide a method of making a spray nozzle such that various types of nozzles having different spray patterns can be produced, such as drum-head nozzles. It is another object of this invention to provide a nozzle where the contours of interpenetrating recesses forming the orifice of the nozzle can be controlled easily and accurately, and wherein the edges of the orifice are less irregular than the prior art.

It is a further object of this invention to provide a method of manufacturing improved airless type spray nozzles including nozzles having the specific structure as described herein.

It is a further object of this invention to provide an airless spray nozzle with an orifice formed by the wedge-shaped groove on one side and an interpenetrating trapezoidal-shaped groove on the opposite side, where the wedge-shaped groove has a substantially straight bottom and the trapezoidal-shaped groove has a substantially flat bottom, wherein the bottom of the wedge-shaped groove is parallel to the bottom of the trapezoidally-shaped groove, and wherein the lines defined by the intersection of the side walls of the trapezoidal-shaped groove with the bottom of the trapezoidal groove are perpendicular to the bottom of the wedge-shaped groove so as to produce an improved flat fan spray pattern or a drum-head pattern.

As a result of this invention an improved airless spray nozzle is possible which is capable of better atomization at lower pressures than possible before; and which has more predictable and controllable fan pattern width, flow rate, and paint distribution. The nozzle exhibits reduced plugging, and is more easily cleaned if plugging does occur.

BRIEF DESCRIPTION OF THE DRAWINGS

FIG. 1 is a perspective view of an airless spray nozzle tip formed by interpenetrating grooves in the tip.

FIG. 2 is a functional view of a grinding wheel cutting a wedge-shaped groove into a nozzle tip blank.

FIG. 3 is a functional view of a grinding wheel cutting a wedge-shaped groove and then a trapezoidally-shaped groove into a nozzle tip blank.

DESCRIPTION OF THE PREFERRED EMBODIMENT

Figure 4:
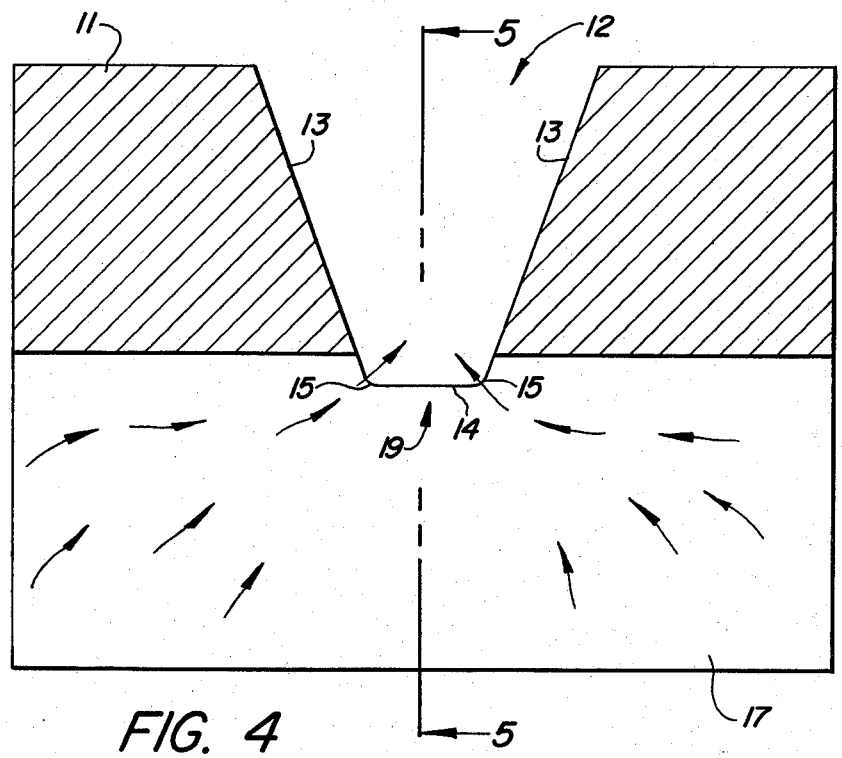
FIG. 4 is a cross sectional view of a nozzle tip having an orifice formed by a wedge-shaped groove interpenetrated by a trapezoidally-shaped groove, taken along the bisector of the wedge-shaped groove.

FIG. 1 is a perspective view of a preferred form of an airless spray nozzle tip resulting from and embodying the present invention. The nozzle tip is made from a solid cylindrical disc 11 of tungsten carbide. In this form, disc 11 has opposed flat faces.

The nozzle tip depicted in FIG. 1 will produce a flat fan spray pattern with paint droplets heavily concentrated toward the middle of the fan pattern, with a diminishing concentration of droplets as the edges of the fan are approached.

The disc 11 in an actual nozzle tip has a thickness dimension of 0.075 inches from one flat face to the other, and a cylindrical diameter of 0.110 inches. Into one flat face of the disc 11 a groove 12 is cut having a cross section substantially in the shape of an isosceles trapezoid; the smaller base 14 of the trapezoidal groove 12 being at the bottom of the groove 12 and defining a plane which is parallel to the flat face of the disc 11. The side walls 13 of the trapezoidal groove 12 slope away from its smaller base 14. Acceptable angles between the side walls 13 and the flat bottom 14 have ranged between 90° to 158°.

From the opposite flat face of the disc 11 another groove 16 is cut. This groove 16 has a cross section substantially in the shape of a wedge having substantially flat side walls 17 forming an angle between them. Acceptable angles between the side walls 17 of the wedge-shaped groove have ranged between 20° to 140°. The bottom 18 of the wedge-shaped groove 16 is substantially straight. The straight bottom 18 of the wedge-shaped groove 16 is perpendicular to the line defined by the intersection of either side wall 13 of the trapezoidal groove 12 with a plane defined by the bottom 14 of the trapezoidal groove 12. Further, in this preferred form the bottom 18 of the wedge-shaped groove 16 is parallel to the plane defined by the flat bottom 14 of the trapezoidal groove 12.

The trapezoidal groove 12 and the wedge-shaped groove 16 interpenetrate each other. That is, the sum of their depths is greater than the thickness of the disc 11 from one flat face to the other. Because of this interpenetration an orifice 19 is formed in the disc 11.

Figure 5:
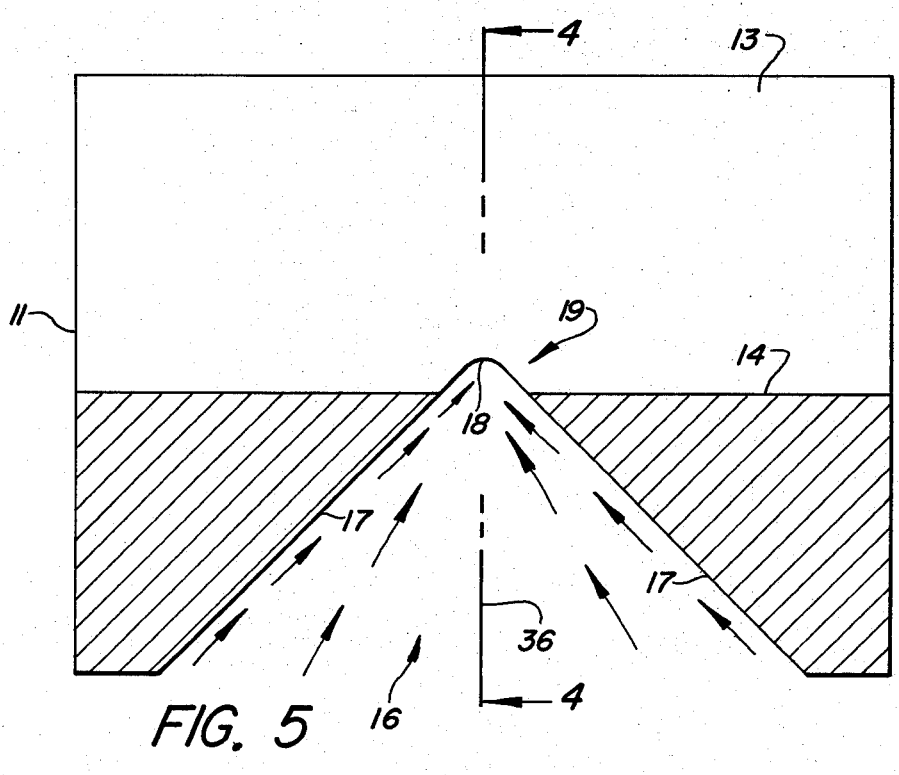
FIG. 5 is a cross sectional view of the nozzle tip of FIG. 4 taken along the line designated 5 in FIG. 4.

FIGS. 4 and 5 show the details of the nozzle tip in cross section. Both of the figures contain unnumbered arrows showing the general direction of the flow of fluid when the side of the tip with the wedge-shaped groove 16 is subjected to fluid under pressure.

FIG. 4 is a cross sectional view of the nozzle tip taken on a plane bisecting the angle formed by the side walls 17 of the wedge-shaped groove 16, and passing through and containing the flat bottom 18 of the wedge-shaped groove 16. It shows that the bottom 14 of the trapezoidal groove is parallel to the flat bottom of the wedge-shaped groove 16.

In FIG. 5 a line 36 indicates a plane bisecting the angle formed by the side walls 17 of the wedge-shaped groove. This plane is perpendicular to the bottom of the trapezoidal groove 12.

As was stated above, in one preferred form the disc 11 from which the nozzle tip is made is tungsten carbide. It is preferred to cut the grooves 12 and 16 after the tungsten carbide has been finally hardened by sintering. After final sintering, tungsten carbide has a hardness ranging from 85 to 92.8 on a Rockwell A scale. Other materials can be used for the disc 11 such as tool steel. Tool steel has a hardness approaching that of tungsten carbide. Tool steel has a hardness of less than 68 on a Rockwell C scale. This hardness corresponds approximately to an 85.5 hardness on a Rockwell A scale. The important thing to note in regard to the material chosen is that as the hardness of the material decreases, the predictability repeatability, and improved functioning of different nozzle tips decreases.

In order to understand how the grooves 12 and 16 can be made in the hardened tungsten carbide reference is made to FIGS. 2 and 3. The disc 11, held mechanically or brazed into a holder (not shown), has a wedge-shaped groove 16 cut into one flat side of the tip 11 by means of a grinding wheel 20. In practice the grinding wheel has a spinning radius of 1.5 inches and operates at 3450 rpm. The wheel 20 is rotated through a shaft 21 connected to some rotating device. The cutting wheel 20 has a circumferential edge in the form of frusto-conical sections abutting at their larger bases, however, the point of abutment of the bases is radiused. This is due to the normal wear of a grinding wheel. In order to cut the tungsten carbide, the cutting wheel 20 has a diamond coated circumferential cutting surface. Further, to facilitate cutting of the tungsten carbide, a high cutting surface speed is required. Therefore, the grinding wheels have a fairly large spinning radius, being in the range of 1.5 inches. As long as cutting surface speeds are maintained a wheel having a 1 inch spinning radius, or possibly smaller, would suffice.

The wedge-shaped groove is cut to a distance of approximately half way through the disc 11.

After the wedge-shaped groove has been cut the trapezoidal shaped groove can be cut in the other side. The disc 11 is turned over and again held mechanically or brazed into a jig or holder. Alternatively the nozzle tip can be brazed in a holder constituting the complete nozzle assembly prior to cutting the trapezoidal groove 12.

FIG. 3 depicts the process by which the trapezoidal groove 12 can be made. A diamond coated cutting wheel 20, again of large spinning radius, cuts a wedge-shaped groove which interpenetrates the wedge-shaped groove on the other side of the tip. In order to make the groove trapezoidal the cutting wheel 20 can then be moved sideways, as indicated by the arrow in FIG. 3. However, an alternate approach would be to use a cutting wheel which had a cross section at its circumferential cutting edge which was trapezoidal. However, it is desirable to use the sideway motion of a cutting wheel having a cross section of its cutting edge being wedge-shaped, because of the fact that the base of the trapezoidal groove can be varied infinitely, with only one cutting wheel 20. This variability of the base 14 of the trapezoidal groove 12 is one factor contributing to manufacture of different nozzle tips having different flow capabilities and fan patterns.

As is stated above, the shape of the grooves 12 and 16 are substantially trapezoidal and wedge-shaped respectively. They are referred to as "substantially" trapezoidal and wedge-shaped due to the fact that they are made with the circumferential edge of a spinning grinding wheel which has a radiused tip in cross section. Therefore, the corners 15 of the trapezoidal groove and the bottom 18 of the wedge-shaped groove are radiused; the walls 13 and 17 of the grooves 12 and 16 are not perfectly flat; the bottom 14 of the trapezoidal groove is not perfectly flat; and the bottom 18 of the wedge-shaped groove 16 is not perfectly straight. However, due to the large cutting radius of the grinding wheel, in relationship to the size of the disc 11 and orifice 19, these characteristics of the grooves as described above are correct for all practical purposes.

Figure 7:
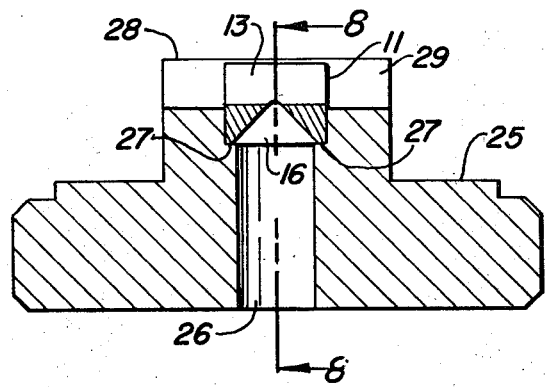
FIG. 7 is a cross sectional view of the nozzle tip of FIG. 1 mounted in a nozzle tip holder.
Figure 8:
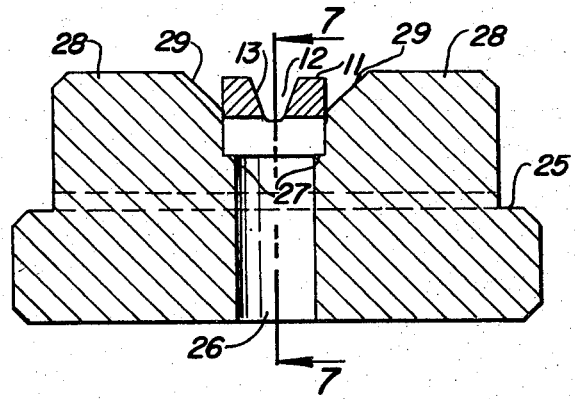
FIG. 8 is a cross sectional view of the nozzle tip and holder of FIG. 7 taken along the line designated 8 in FIG. 7.

The way in which the nozzle tip is mounted into a holder 25 after cutting the grooves is depicted in FIGS. 7 and 8. The holder 25 has a fluid passage 26 through it having a diameter smaller than the diameter of the disc 11. One end of the passage 26 is counterbored to provide a cylindrical seat having an annular step 27. The tip is brazed into the seat. A slot extends across the discharge surface of the holder 25. The tip is positioned so that the trapezoidal groove in the tip is parallel to the slot in the holder 25. The slot has side walls 29 which slope toward the tip. The sloping side walls 29 intercept the tip at a point above the bottom of the wedge-shaped groove 16, so that when the tip is brazed into the seat a hydraulic seal is formed completely around the tip. In actual practice the tip is brazed into the holder 25 prior to the cutting of the trapezoidal exit side groove 12.

Figure 6:
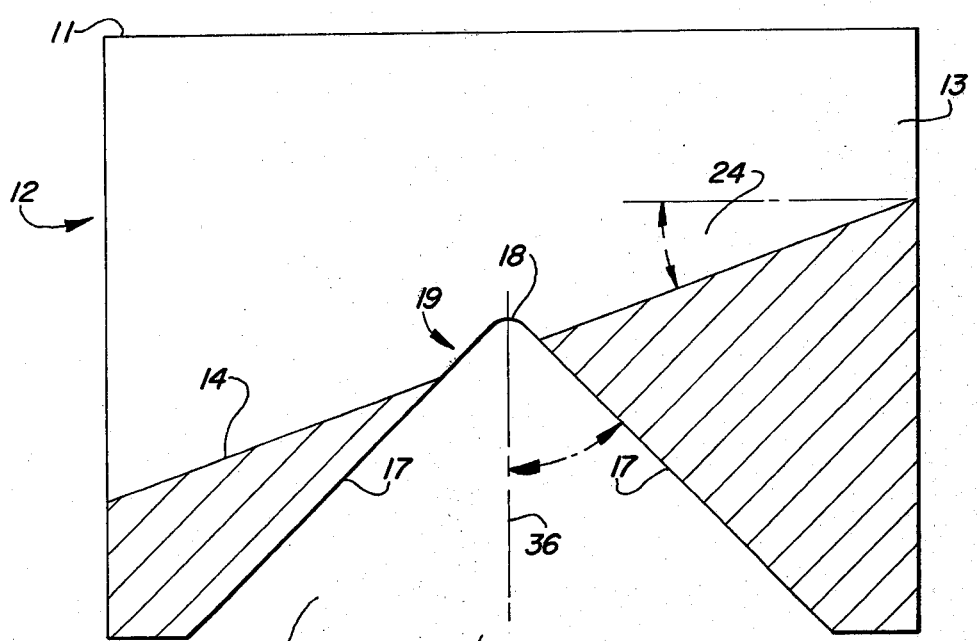
FIG. 6 is a cross sectional view of an airless drum-head type nozzle.

It has also been found that a wedge-shaped groove 16 on the pressurized side of the tip interpenetrating a trapezoidal shaped groove 12 on the discharge side of the tip can also produce a controlled pattern or drum head nozzle. Such a nozzle is depicted in FIG. 6. This drum head nozzle is identical to the standard flat fan spray nozzle, with the exception that a plane 36 bisecting the wedge-shaped groove 16 forms an angle other than 90° with respect to the plane defined by the base 14 of the trapezoidal groove 12. In the preferred embodiment this also means that the lines defined by the intersection of the side walls 13 with the bottom 14 of the trapezoidal groove form the same angle with respect to the plane bisecting the wedge-shaped groove. An acceptable angle has been found to be between 15° and 30° from the perpendicular.

Figure 9:
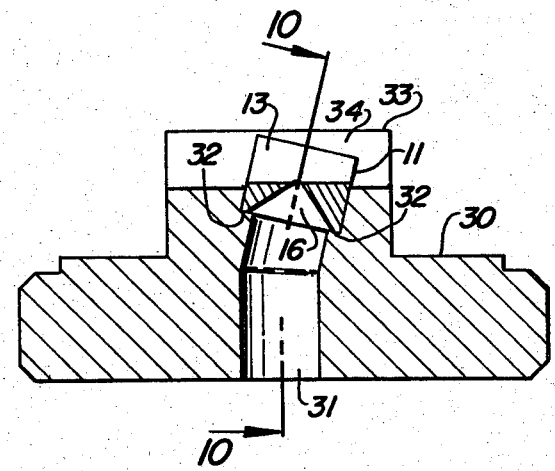
FIG. 9 is a cross sectional view of a drum-head nozzle tip in a holder.
Figure 10:
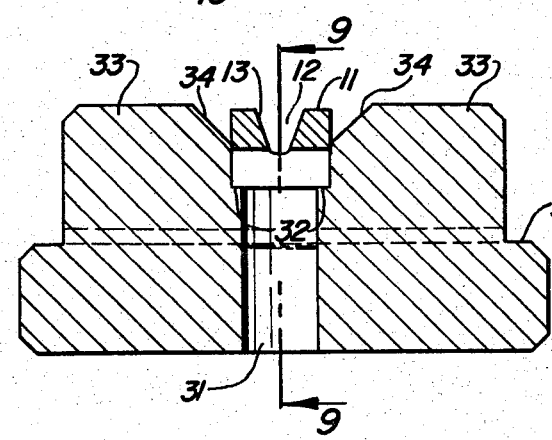
FIG. 10 is a cross sectional view of the drum-head nozzle and holder of FIG. 9 taken along the line designated 10 in FIG. 9.

Reference can be made to FIGS. 9 and 10 in order to appreciate the method by which such a drum head type nozzle can be cut. After cutting the wedge-shaped groove 16 just as in the nozzle tip of FIG. 1, the tip is mounted into a holder 30 wherein the fluid passage 31 is angled by 15° to 30° from the perpendicular in a plane parallel to the direction in which the trapezoidal groove will be cut. After brazing the tip into the holder 30 the trapezoidal groove 12 can be cut parallel to the base of the tip holder 30. Because the tip is angled with respect to the base of the holder 30 the bottom of the trapezoidal cut will be angled by the same amount with respect to a plane bisecting the angle formed by the side walls 17 of the wedge-shaped cut 16.

In the total operation of the nozzle tip, various characteristics of the grooves influence the characteristics of the spray pattern. As was stated above, cutting the grooves into a harder material results in better spray characteristics. Further, as the grit of the grinding wheel cutting surface is made finer the more regular are the surfaces of the grooves and the edges of the orifice. 400 grit grinding wheels have been used for rough cutting and for nozzles where the spray characteristics are not required to be tightly controlled; and 500 grit grinding wheels have been used where a high degree of accuracy is required.

Figure 11:
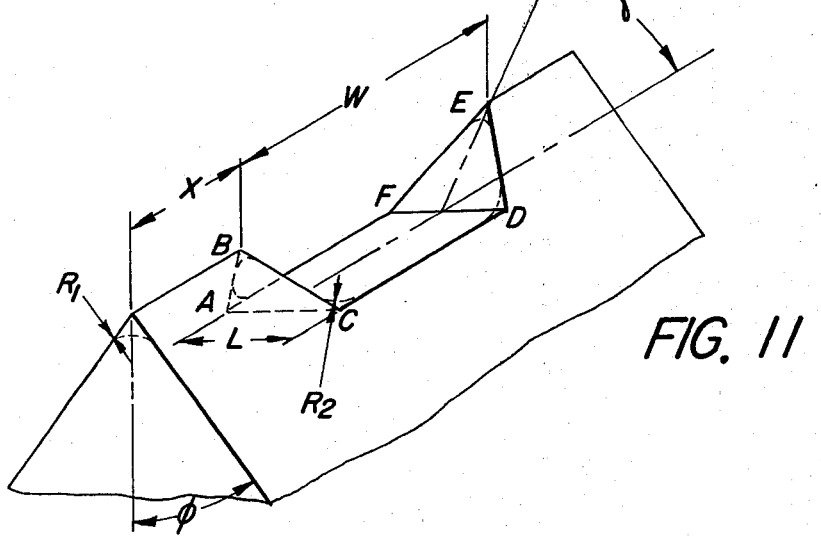
FIG. 11 is a graphical representation of the intersecting grooves and the orifice thereby formed in the nozzle tip of FIG. 1.

In order to understand the operation of the nozzle tip, reference is made first to FIG. 11. FIG. 11 shows a geometrical representation of the orifice 19. The orifice 19 is the area defined by the combination of triangles ABC and DEF partially folded at the ends of rectangle ACDF. The simplicity of the geometry of the orifice assists in making the operation of the tip predictable and controllable.

In operation, the wedge-shaped groove 16 is subjected to fluid under pressure. Referring for a moment to FIG. 4, it is noted here that the direction of flow of fluid in the wedge-shaped groove 16 is indicated generally by the arrows. Fluid flows from the ends of the wedge-shaped groove 16 toward the orifice. Upon reaching the orifice, the fluid is ejected through the triangular areas to the two ends of the orifice 19 (designated triangles ABC and DEF in FIG. 11). The fluid streams issuing through these triangular ends of the orifice are directed at each other. These two streams tend to compress the overall stream of fluid issuing from the orifice and cause the overall stream to form into a flat sheet of fluid which then breaks up into atomized droplets. The forces arising from these two streams issuing from the orifice can be called the widening forces; as these forces increase, the fan pattern gets wider.

It is noted here that there are also forces arising in this nozzle tip which have an opposite effect on the stream issuing from the orifice; that is, forces which tend to reduce the angle of the fan pattern issuing from the orifice. These forces can be better understood by referring to FIG. 5. FIG. 5 is a cross sectional view of the nozzle tip of FIG. 4 taken in a plane perpendicular to the plane of FIG. 4 and passing through a line designated 5. FIG. 5 shows a cross section of the wedge-shaped groove 16 at the bottom. The arrows again show the direction of fluid flow, and hence the forces arising in the plane of FIG. 5. Fluid flows along the walls 17 of the groove 16 and causes the fluid to be directed toward the center of the orifice. These forces cause the fan pattern to have a smaller angular dimension. These forces can be called the narrowing forces.

The flow capacity of the orifice 19 is proportional to the overall area of the whole orifice 19.

In order to show the effect of changing various dimensions of the orifice grooves, reference is now made to FIG. 11. In FIG. 11 the angle $\phi$ represents the angle between a bisector of the wedge-shaped groove 16 and a wall 17 of the wedge-shaped groove. The angle $\gamma$ designates the supplement of the angle between the walls 13 of the trapezoidal groove 12 and the bottom 14 of the trapezoidal groove 12. W designates the distance for which the trapezoidal groove 12 intersects the bottom 18 of the wedge-shaped groove 16. This distance W can be called the width of the orifice 19. L designates the length of the orifice 19. The length is the distance by which the wedge-shaped groove 16 intersects the bottom 14 of the trapezoidal groove 12. $R_1$ designates the radiused bottom which results in the wedge-shaped groove due to the radiused cutting tip of the wheel used to cut the wedge-shaped groove. $R_2$ designates the radius corners of the trapezoidal groove caused by the radiused tip of the cutting wheel used to cut the trapezoidal groove. The letters A,B,C,D,E and F designate the corners of the orifice 19 formed by the intersection of the wedge-shaped groove 16 and the trapezoidal groove 12. X designates the distance for which the bottom of the wedge-shaped groove extends from the orifice 19.

As the angle $\phi$ is made larger the angle at which the narrowing forces are directed toward each other increases and hence causes an increase in the narrowing forces acting on the fan pattern produced. As the angle $\gamma$ is increased the streams of fluid issuing from the triangular parts of the orifice ABC and DEF are directed more directly at each other, and hence cause the widening forces to increase. An increase in the widening forces tends to cause the fan pattern to be wider.

Experimentally it has been determined that the spray fan widening forces increase with the area defined as $(ABC+DEF)\cdot\sin\gamma$. Also experimentally it has been found that the spray fan narrowing forces increase with the magnitude of the projection of the area ABCDEF on the ACDF plane multiplied by $\sin\phi$. Further experimentally, it has been determined that the pattern width is proportional to the square root of the ratio of the fan widening forces to the fan narrowing forces.

It has further been found experimentally that it is necessary to make the distance X by which the bottom of the wedge-shaped groove extends beyond either side of the orifice long enough to cause fluid streams to issue from the triangular portions (ABC and DEF) of the orifice so as to impinge on each other.

Also experimentally, it has been found that it is desirable to make the width at least 0.66 of the length but less than 3.5 times the length.

Any given orifice can be defined by the angle $\phi$, the angle $\gamma$, the length L and the width W of the orifice. A wide range of flow capacity nozzles having various fan patterns have been successfully produced. The following table gives just a few of such nozzles, defined by: the length L (in inches); the width W (in inches); the angle $\phi$ (in degrees); and the angle $\gamma$ (in degrees). For each of these nozzles is provided a flow rate (in grams of water per second at 40 psi) and also the pattern width (in inches, 10 inches away from the orifice).

| $\phi(°)$ | $\gamma(°)$ | W(") | L(") | FLOW | PATTERN WIDTH |
|---|---|---|---|---|---|
| 58.5 | 32.5 | 0.0042 | 0.0056 | 12 | 3½ |
| 58.5 | 75 | 0.0071 | 0.008 | 27.3 | 4½ |
| 58.5 | 70 | 0.042 | 0.021 | 4375 | 7½ |
| 45 | 70 | 0.064 | 0.026 | 1057 | 9½ |
| 45 | 70 | 0.024 | 0.015 | 216 | 10⅝ |
| 45 | 30 | 0.017 | 0.01 | 106.7 | 8¼ |
| 45 | 30 | 0.007 | 0.009 | 31.6 | 6 |
| 45 | 30 | 0.008 | 0.009 | 37.1 | 4¾ |
| 30 | 37.5 | 0.006 | 0.0022 | 8 | 3½ |
| 30 | 37.5 | 0.014 | 0.0027 | 16 | 6 |
| 30 | 75 | 0.020 | 0.005 | 63 | 4¾ |
| 30 | 70 | 0.072 | 0.034 | 1596 | 13½ |
| 30 | 70 | 0.012 | 0.004 | 23 | 3 |
| 30 | 70 | 0.052 | 0.026 | 932 | 17 |

Figure 12:
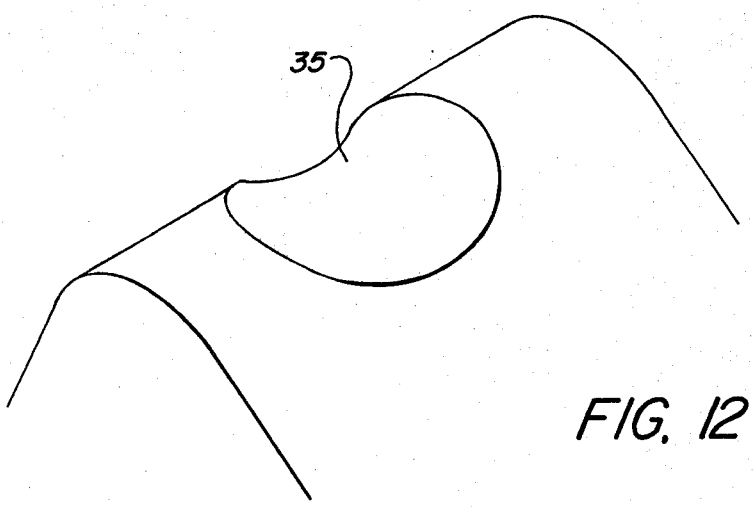
FIG. 12 is a graphical representation of the contours and orifice formed by the interpenetration of two cylindrical grooves.

A wide range of nozzles have been made by the method of this invention. Some of the smaller flow rate nozzles which have been successfully made actually result from the intersection of less than a wedge-shaped groove and a trapezoidal groove. Some nozzles produced were merely the interpenetration of the radiused tips of the cutting wheel. Such an interpenetration produces an orifice having a saddle shaped edge. Such an orifice is geometrically represented in FIG. 12. As can be seen in FIG. 12, the shape of the orifice 35 is generally saddle shaped. However, when such an orifice is produced by the interpenetration of grooves from opposite sides of a nozzle tip which has previously been hardened, the improved regularity of the edge of the orifice allows such orifices to give superior performance.

Having described my invention, I claim:

1. An airless spray nozzle comprising a tip having an orifice formed by a first groove on a first side of the tip, with side walls which make the groove substantially wedge-shaped at the bottom; and
   an interpenetrating second groove on a second side of the tip opposed to the first side, said second groove being substantially trapezoid shaped with a substantially flat bottom and with side walls angled away from the bottom of said second groove;
   wherein the spray tip produces a flat fan spray pattern of liquid when the tip is connected to a source of fluid under pressure.

2. The apparatus of claim 1 which further comprises means adapting the tip to be connected to a source of fluid under pressure.

3. The apparatus of claim 1 wherein a plane bisecting the angle formed by the walls of the first groove forms an angle with the bottom of the second groove greater than or equal to 60° but less than or equal to 90°.

4. The apparatus of claim 2 where both grooves are cut into the tip after the tip is as hard or harder than 50 on a Rockwell C scale.

5. The apparatus of claim 4 wherein the material out of which the tip is made has a low ductility when the grooves are cut.

6. The apparatus of claim 2 where both grooves are cut into the tip after the tip is as hard or harder than 85 on a Rockwell A scale.

7. The apparatus of claim 6 wherein the material out of which the tip is made has a low ductility when the grooves are cut.

8. The apparatus of claim 2 wherein the side of the tip with the wedge-shaped groove is adapted to be connected to a source of fluid under pressure.

9. The apparatus of claim 1 wherein the first groove has a substantially straight bottom defining a first line, and the flat bottom of the second groove defines a bottom plane;
   wherein said first line is parallel to said plane;
   and wherein second and third lines line defined by the intersection of the side walls of the second groove with said plane are perpendicular to said first line.

10. The apparatus of claim 9 wherein a plane bisecting the angle formed by the walls of the first groove forms an angle with the bottom of the second groove greater than or equal to 60° but less than or equal to 90°.

11. The apparatus of claim 1 where the side walls of the first groove form an angle between them greater than or equal to 20° but less than or equal to 140°;
   and wherein the side walls of the second groove form angles with the flat bottom of the second groove which are greater than 90° but less than 158°.

12. The apparatus of claim 11 wherein the first groove extends beyond each side of the orifice.

13. The apparatus of claim 12 wherein a line bisecting in right section the angle formed by the walls of the first groove forms an angle with the bottom of the second groove greater than or equal to 60° but less than or equal to 90°.

14. The apparatus of claim 13 wherein the side of the tip with the wedge-shaped groove is adapted to be connected to a source of fluid under pressure.

15. The apparatus of claim 13 wherein both grooves are cut into the tip after the tip material is as hard or harder than 50 on a Rockwell C scale.

16. The apparatus of claim 15 wherein both grooves are cut into the tip after the tip material is as hard or harder than 85 on a Rockwell A scale.

17. The apparatus of claim 15 wherein the side of the tip with the wedge-shaped groove is adapted to be connected to a source of fluid under pressure.

18. The apparatus of claim 12 where the first groove has a substantially straight bottom defining a first line, and the flat bottom of the second groove defines a bottom plane;
   wherein said first line is parallel to said plane;
   and wherein second and third lines line defined by the intersection of the side walls of the second groove with said plane are perpendicular to said first line.

19. The apparatus of claim 18 wherein a plane bisecting the angle formed by the walls of the first groove forms an angle with the bottom of the second groove greater than or equal to 60° but less than or equal to 90°.

20. The apparatus of claim 19 wherein said bisecting plane is perpendicular to said bottom plane and wherein the first groove is interpenetrated by the second groove such that the line defined by the bottom of the first groove is cut by a distance defined as the width of the orifice;

wherein the second groove is interpenetrated by the first groove such that the plane defined by the bottom of the second groove is cut in a direction perpendicular to said width of the orifice for a distance defined as the length of the orifice; and wherein the width is at least as great as 0.66 times the length but less than 3.5 times the length.

21. The apparatus of claim 20 wherein the side of the tip with the wedge-shaped groove is adapted to be connected to a source of fluid under pressure.

22. The apparatus of claim 20 wherein both grooves are cut into the tip after the tip material is as hard or harder than 50 on a Rockwell C scale.

23. The apparatus of claim 20 wherein both grooves are cut into the tip after the tip material is as hard or harder than 85 on a Rockwell A scale.

24. The apparatus of claim 22 which further comprises means adapting the side of the tip with the wedge-shaped groove to be connected to a source of fluid under pressure.

25. The method of making an airless spray nozzle tip comprising the step of:

cutting interpenetrating grooves in a shape having bottom portions which are wedge-shaped in cross section into opposed sides of a nozzle tip blank that has previously hardened to rockwell C50 or harder, resulting in an orifice; so that the orifice thereby formed produces a flat fan spray pattern when one side is connected to a source of fluid under pressure.

26. The method of claim 25 wherein the nozzle tip blank has previously hardened to Rockwell A 85 or harder.

27. The method of making an airless spray nozzle tip comprising the step of:

cutting interpenetrating grooves, with one groove having a bottom portion which is trapezoidal in cross section, into opposed sides of a nozzle tip blank that has previously hardened to rockwell C50 or harder, resulting in an orifice; so that the orifice thereby formed produces a flat fan spray pattern when one side is connected to a source of fluid under pressure.

28. The method of claim 27 wherein the nozzle tip blank has previously hardened to Rockwell A 85 or harder.

29. The method of claim 27 wherein the step of cutting the grooves comprises the step of cutting the other groove in a shape having a bottom portion which is wedge-shaped in cross section.

30. The method of claim 29 wherein the nozzle tip blank has previously hardened to Rockwell A 85 or harder.

31. The method of claim 25 which further comprises the step of cutting the grooves with a circumferential edge of a rotating grinding wheel, said edge being substantially in the shape of conical sections abutting at their larger bases, said wheel having a spinning radius of at least one inch, and having a cutting surface capable of cutting the hardened blank.

32. The method of claim 31 wherein the blank has previously hardened to Rockwell A 85 or harder.

33. The method of claim 31 wherein the grooves are cut with a wheel having a cutting surface of 400 grit or finer.

34. The method of claim 33 wherein the blank has previously hardened to Rockwell A 85 or harder.

35. The method of claim 27 which further comprises the step of cutting the grooves with a circumferential edge of a rotating grinding wheel, said edge being substantially in the shape of conical sections abutting at their larger bases, said wheel having a spinning radius of at least one inch, and having a cutting surface capable of cutting the hardened blank.

36. The method of claim 35 wherein the blank has previously hardened to Rockwell A 85 or harder.

37. The method of claim 35 wherein the grooves are cut with a wheel having a cutting surface of 400 grit or finer.

38. The method of claim 37 wherein the blank has previously hardened to Rockwell A 85 or harder.

39. The method of claim 30 which further comprises the step of cutting the grooves with a circumferential edge of a rotating grinding wheel, said edge being in the shape of conical sections abutting at their larger bases, said wheel having a spinning radius of at least one inch, and having a cutting surface capable of cutting the hardened blank.

40. The method of claim 39 wherein the blank has previously hardened to Rockwell A 85 or harder.

41. The method of claim 39 wherein the grooves are cut with a wheel having a cutting surface of 400 grit or finer.

42. The method of claim 41 wherein the blank has previously hardened to Rockwell A 85 or harder.

* * * * *